United States Patent [19]
Ramage

[11] 3,878,560
[45] Apr. 15, 1975

[54] SIGNAL PROCESSING AND REPRODUCING METHOD AND APPARATUS FOR SINGLE VIDEO FRAME REPRODUCTION WITH ASSOCIATED AUDIO

[75] Inventor: William W. Ramage, Murrysville, Pa.

[73] Assignee: Westinghouse Electric Corporation, Pittsburgh, Pa.

[22] Filed: Mar. 12, 1974

[21] Appl. No.: 450,532

Related U.S. Application Data

[63] Continuation of Ser. No. 308,895, Nov. 22, 1972.

[52] U.S. Cl. .............. 360/10; 178/5.6; 178/DIG. 3; 178/DIG. 35; 360/8; 360/24; 360/35; 360/72

[51] Int. Cl. .............. H04n 5/78

[58] Field of Search .............. 360/10, 33, 35, 19, 8, 360/9, 24, 23; 178/6.6 DD, 6.6 FS, DIG. 3, DIG. 35, 5.6, 5.8 R; 179/1 SA, 15.55 R, 15.55 TC

[56] References Cited

UNITED STATES PATENTS

| | | | |
|---|---|---|---|
| 3,085,130 | 4/1963 | Levelson | 178/DIG. 35 |
| 3,349,184 | 10/1967 | Morgan | 179/15.55 R |
| 3,371,156 | 2/1968 | Frohbach et al. | 178/6.6 A |
| 3,383,461 | 5/1968 | Dryden | 178/DIG. 3 |
| 3,391,247 | 7/1968 | Frohbach et al. | 178/6.6 A |
| 3,398,241 | 8/1968 | Lee | 179/1 SA |
| 3,446,914 | 5/1969 | Hodge | 178/6.6 A |
| 3,701,846 | 10/1972 | Zenefilis | 178/6.6 DD |
| 3,702,378 | 11/1972 | Bogenberger | 178/5.8 R |
| 3,715,481 | 2/1973 | Ham | 178/6.6 FS |
| 3,745,264 | 7/1973 | Emerson et al. | 179/1 SA |
| 3,781,479 | 12/1973 | Svoboda | 178/DIG. 3 |

OTHER PUBLICATIONS

Publication I-Audible Message Generator, Reynolds, IBM Tech. Disc. Bull., Vol. 6, No. 6, 11/63.
Reviewing Slow-Motion Disc Principles, Stratton, Broadcast Engineering, pp. 14–18, 2/69.
Video Recorder with Multiplex Audio, Frost et al., IBM Tech. Disc. Bull., Vol. 11, No. 7, 12/68, p. 793.

*Primary Examiner*—Raymond F. Cardillo, Jr.
*Attorney, Agent, or Firm*—M. P. Lynch

[57] ABSTRACT

A method and system for processing low rate signals, such as audio frequency signals, wherein the low rate signals are converted to high rate signals by sampling at a predetermined rate sufficient to retain the intelligence in the low rate signals and recording the sample signals at predetermined locations on a track of a high rate recording media by repeated passes over the track for a predetermined number of cycles. Reproduction is effected by sampling the track at the predetermined locations at the predetermined rate and demodulating to obtain the original intelligence. High frequency signals, such as video frequency signals, may also be recorded on the recording media in correlation with the low frequency signals.

10 Claims, 5 Drawing Figures

INVENTOR
William W. Ramage
ATTORNEY

SIGNAL PROCESSING AND REPRODUCING METHOD AND APPARATUS FOR SINGLE VIDEO FRAME REPRODUCTION WITH ASSOCIATED AUDIO

CROSS-REFERENCE TO RELATED APPLICATIONS

This application is a continuation of Ser. No. 308,895 filed Nov. 22, 1972, now abandoned and Ser. No. 76,572 filed Sept. 29, 1970 now abandoned.

BACKGROUND OF THE INVENTION

The present invention relates to systems and methods for processing signals for recording and reproduction and, more particularly, to systems for processing signals having different time-bandwidth characteristics.

DISCUSSION OF THE PRIOR ART

A need exists for an audio-visual library wherein a relatively large number of audio-visual presentations are stored and a selected audio-visual presentation may be retrieved in a minimum amount of time. The visual portion of a given presentation may comprise, for example, a single frame of video information which may be continuously replayed for the desired time period thus resulting in a still-picture (slide) type of presentation. The various frames of video information may conveniently be recorded on a wide band recording media, such as, a video tape recorder or a magnetic recording disc. In a standard television format each frame (two interlaced fields) of video information requires one-thirtieth of a second. Hence in one-thirtieth of a second one frame of video information could be transferred from the recording media to a buffer storage media which could then be repeatedly replayed to display the frame of video information on a suitable monitor as long as desired. The video signals comprising the video information are high rate signals requiring a wide bandwidth for recording, for example 4 MHz. However, the time duration required for the video information is relatively short, for example, one-thirtieth of a second for a frame. On the other hand, audio information correlated with the video information would require a small bandwidth, for example 4 KHz., for recording such low rate signals. However, the desired time for the audio presentation portion corresponding to the single frame of video may extend over several seconds. The mismatch of time-bandwidth characteristics between the audio and video signals creates a problem in recording and transferring the audio portion of an audio-visual presentation in a convenient manner. Thus, if real time recording of audio is utilized, the track length of the recording media required would have to accommodate the several seconds of the audio presentation. Moreover, if the audio information is to be transferred to another recording media, this will tie up the library recording media for the entire time required to transfer the audio information. Additionally, correlation then must be accomplished between the transferred video and audio information to insure proper correspondence for the individual units of presentation.

SUMMARY OF THE INVENTION

Broadly the present invention provides a method and apparatus for processing and retrieving low rate signals by matching the time-bandwidth requirements to that of the recording media.

DESCRIPTION OF THE PREFERRED EMBODIMENTS

Figures 1, 2:
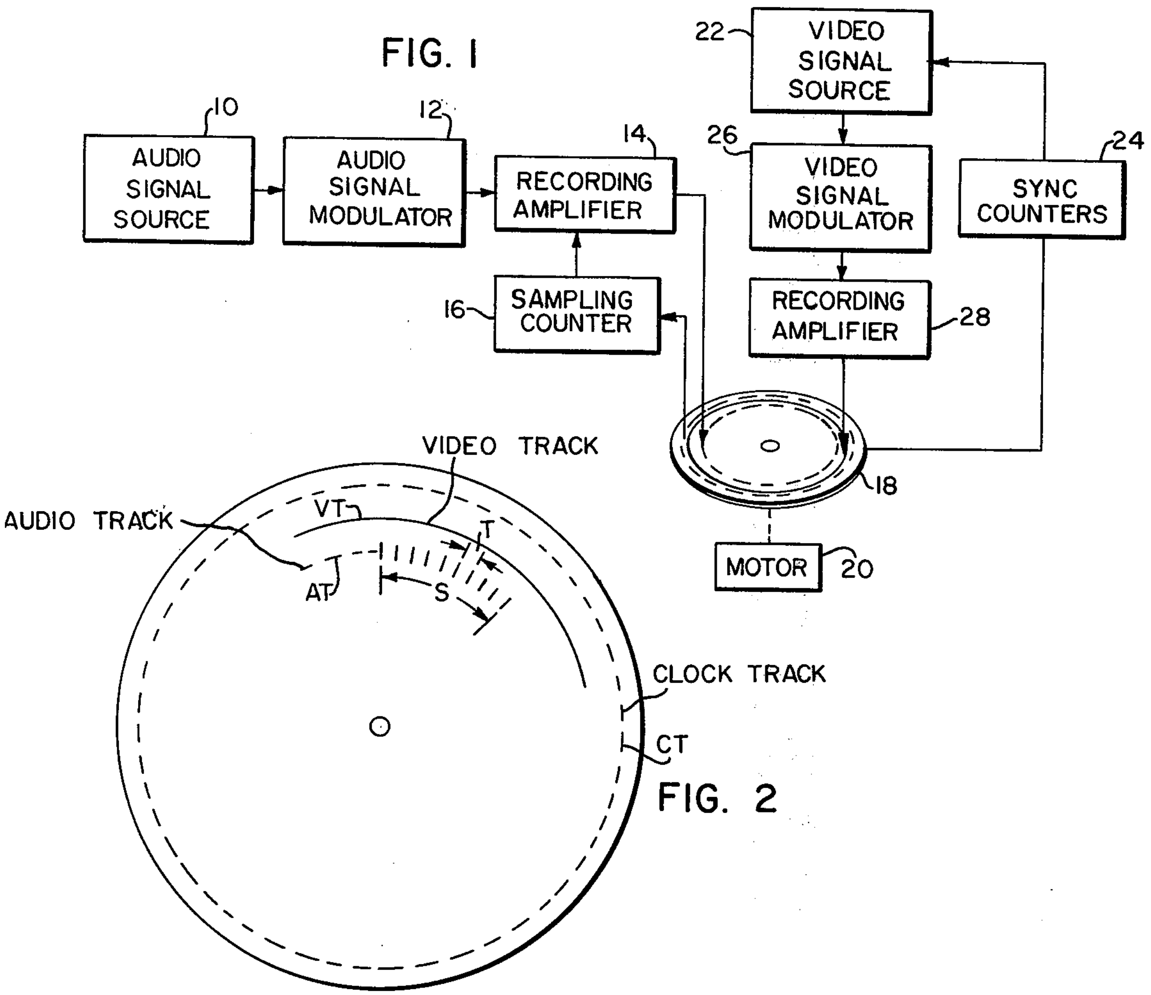
FIG. 1 is a block diagram of the present invention for processing and recording signals in accordance therewith.
FIG. 2 is a pictorial diagram showing a magnetic recording disc as a recording media for use in the present invention.

Referring to FIG. 1 the method and apparatus for processing and recording low rate signals, such as audio frequency signals, and high rate signals, such as video frequency signals, on the same wide band recording media will be described. Throughout the description various operating parameters are given for the purposes of explanation and are only deemed to be exemplary.

An audio signal source 10, which may comprise, for example, a microphone or a recorded source of audio frequency signals, supplies audio signals having a relatively narrow audio frequency bandwidth of for example 4,000 Hz. The low rate audio signals are converted to high rate signals in an audio signal modulator 12 which may, for example, comprise a frequency modulator having a carrier frequency in the high rate video frequency range. The audio frequency signals will thus cause deviation of the carrier frequency above and below the carrier frequency and either the higher or lower sideband may be suppressed.

The low rate audio frequency signals converted to high rate signals are applied to a recording amplifier 14. As is known by sampling theory, if a waveform is sampled at a rate of at least twice the highest frequency component of the waveform then it can be recovered by processing the samples with a low pass filter network. As an example with the audio signals having a highest frequency of 4,000 Hz., if the modulated waveform at the output of the audio signal modulator 12 is sampled at at least an 8,000 samples per second rate, the original intelligence in the audio signal can be retained.

In order to effect the sampling of the input to the recording amplifier 14, a sampling counter 16 is provided which receives a clock input which may be provided conveniently from the recording media upon which the sampled signals are to be recorded. In the embodiment of FIG. 1 the recording media is shown to be a magnetic recording disc 18; however, it should be understood that the recording media could comprise any other wide band recording media such as a video tape recorder. The disc 18 may be conveniently driven by a synchronous motor at 1,800 revolutions per minute. (30 revolutions per second);

FIG. 2 shows a schematic representation of the various tracks to be recorded on the disc 18. A clock track CT is provided at the outer periphery of the disc 18 whereupon a predetermined number of clock signals, for example a minimum of 68,000, in the present example, would be pre-recorded on the track CT. With a speed of rotation of the disc 18 of 30 revolutions per second this would mean a rate of 2,040,000 pulses per second as a clock rate.

Thus, with 68,000 clock samples being recorded on the track CT, if the sampling counter 16 provides a sampling output pulse for each 255 input clock pulses, the input to the recording amplifier 14 will be sampled at a rate of 8,000 samples per second. in the present example if 8.5 seconds of audio signals were sampled at a rate of 8,000 samples per second this would mean that 68,000 samples will be taken in the 8.5 seconds. With a speed of rotation of the disc 18 of 30 revolutions per second, it would thus require 255 revolutions in order to record 8.5 seconds of sampled audio signals.

The output of the recording amplifier 14 is thus sampled signals at the rate of 8,000 per second. These signals are then recorded on an audio track AT of the disc 18 as shown in FIG. 2. The beginning point of the audio information may be appropriately indexed on the disc 18 by recorded index signals. Hence, in one revolution of the track AT requiring one-thirtieth of a second, 266 samples would be taken, plus two-thirds of time would have elapsed for the taken of the next sample. The time period S between these samples would e equal to 1/8,000 seconds. During the next one-thirtieth of a second period of rotation another 266+ samples would be taken. Over 255 revolutions of the track AT the total capacity C of 68,000 samples would be taken. The time period T between the individual samples on the audio track AT after the total 255 cycles would be 1/8,000 × 255 = 1/2,040,000.

FIG. 2 shows schematically the relationship between the samples taken at a repetition rate of 8,000 samples per second, having a time period S between samples and the time period T between adjacent samples after the entire 255 rotations have been completed. In order to insure that no over-writing of samples occurs in a given period *S* it is necessary that the ratio *R* of *S* (which in the present example is equal to 255) be relatively prime with respect to the total capacity of samples *C* (which in the present example is 68,000). That is, *R* may not evenly be divided into C and vice versa. This may be also seen in that the number of samples taken during a single rotation of the track AT of the disc 18 is a non-integer (266 ⅔), so that the sampling automatically indexes itself and in a total of 255 revolutions of the disc 18, 68,000 evenly spaced samples will be recorded on the audio track AT.

Accordingly 8.5 seconds of audio information is recorded on the single track AT of the disc 18 composed of 68,000 individual samples wherein adjacent individual samples are disposed according to the sampling pattern which is built up over a total of 255 rotations of the disc 18.

Other techniques of packing the audio might be used. One example would be to divide the 68,000 sample capacity into 272 distinct sections of 250 samples. The samples would be assigned to a first location in each section on the first disc revolution, a second location on the second and so forth. In the given example this would produce a slightly higher sampling rate and shorter audio message (8⅓ seconds instead of 8½ seconds).

Video information comprising for example a single frame (two fields) to which the original audio information relates may be recorded on a separate track VT of the disc in a standard manner. In the embodiment of FIG. 1 this is accomplished by providing a video signal source 22 which may for example comprise a television camera. The video signal source 22 is synchronized with the disc 18 via a sync counter 24. The input to the sync counter 24 is provided by the pre-recorded clock track CT or may be provided from a separate pre-recorded synchronizing track on the disc 18. The sync counter 24 is responsive to provide, for example, a standard horizontal scanning rate of 15,750 Hz. and a standard vertical scanning rate of 60 Hz. With a standard vertical scanning rate of 60 Hz. one complete frame, that is, two interlaced fields, would be completely scanned in a time period of one-thirtieth of a second. Thus one complete frame of video information can be recorded upon a single track VT of the disc 18 in one revolution thereof requiring one-thirtieth of a second.

The video output of the video signal source 22 comprising high rate signals is applied to a video signal modulator 26 wherein the video signals are, for example, frequency modulated on a carrier frequency selected to be near the upper band pass limit of the magnetic recording disc 18, with the upper side band being eliminated and the lower side band being amplified in a recording amplifier 28 and recorded on the video track VT of the disc 18 as shown in FIG. 2. The video signal source 22, under the control of the sync counter 24 hence outputs one complete frame which is modulated, amplified and then recorded onto the video track VT in one revolution of the disc 18. The video signal source 22 may then be deactivated with the video intelligence thereof being recorded on the video track VT for subsequent reproduction.

Thus the recording on the disc 18 comprises one frame of video and 8.5 seconds of audio correlated therewith. This may constitute one unit of information. Also additional audio information could be recorded on another track of the disc 18 with another 8.5 seconds of audio capable of being recorded on the additional track. Also, other audio visual information units could be recorded on the disc 18 with one track being required for each frame of video information and one track for each 8.5 seconds of audio information correlated with the video.

Figure 3:
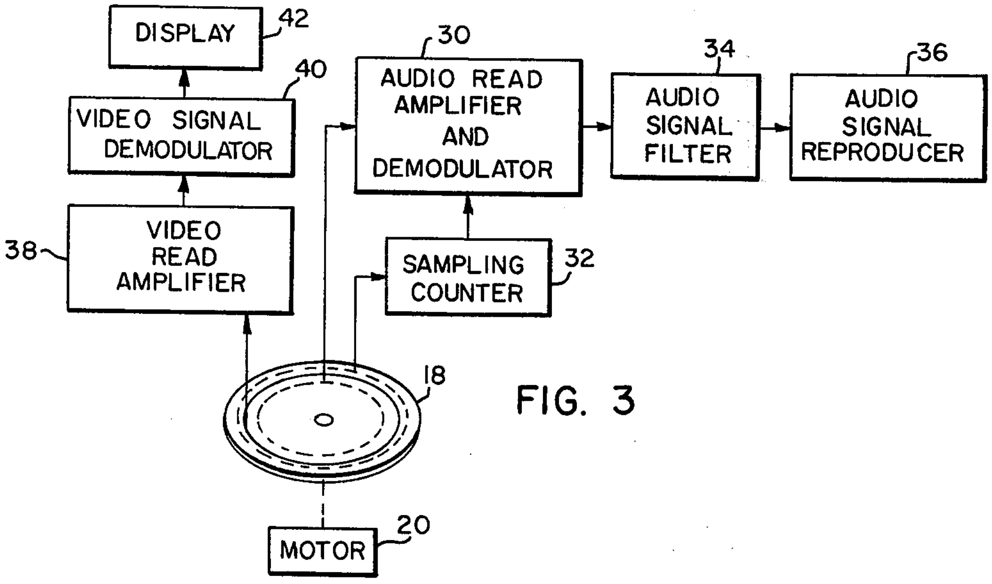
FIG. 3 is a block diagram showing the reproduction portion of the present invention.

FIG. 3 demonstrates how the video and audio information recording to the precedure as described above may be reproduced. The sampled audio on the track AT of the disc 18 is applied to an audio read amplifier and demodulator 30. The clock pulses on the track CT of the disc 18 are applied to a sampling counter 32 which in response thereto supplies an output to the audio read amplifier and demodulator 30 at the original sampling rate of the audio information which in the present example would be 8,000 Hz. Accordingly, the audio read amplifier and demodulator 30 is activated at successive time periods as to sample the particular information recorded on the track AT at the time intervals S. since in their recording operation as discussed in FIG. 1 successive samples of the audio information were recorded at time intervals S, the audio read amplifier and demodulator 30 will receive successively the audio samples in the sequence in which they have been recorded.

In one revolution of the track AT 266 samples, would be taken, spaced apart by a time interval S and two-thirds of the next sampling interval will have occurred. In a total of 255 revolutions of the track AT the entire audio information comprising 8.5 seconds of audio will have been sampled and demodulated in the audio read amplifier and demodulator 30. The demodulated output of the demodulator 30 is applied to an audio signal filter 34 for recomposition therein as a typical audio waveform suitable for reproduction and having a bandwidth of approximately 4,000 Hz. The recomposed output of the filter 34 is applied to an audio signal reproducer 36 which may comprise a loud speaker such as a set of earphones.

The video information recorded on the track VT of the disc 18 is applied to a video read amplifier 38 and is then applied to a demodulator 40 for recomposition to a video waveform corresponding to the original video information. The reconstituted video signals are applied to a display 42 which may comprise a television monitor.

The video track VT comprising one frame of video information is scanned once each one-thirtieth of a second and is repeatedly rescanned as the audio sampling and demodulation occurs over the 255 revolutions of the disc 18 for the reproduction of 8.5 seconds of audio. Accordingly, a still picture corresponding to the video information is provided on the display 42 much as a slide presentation during the corresponding audio reproduction.

Figure 4:
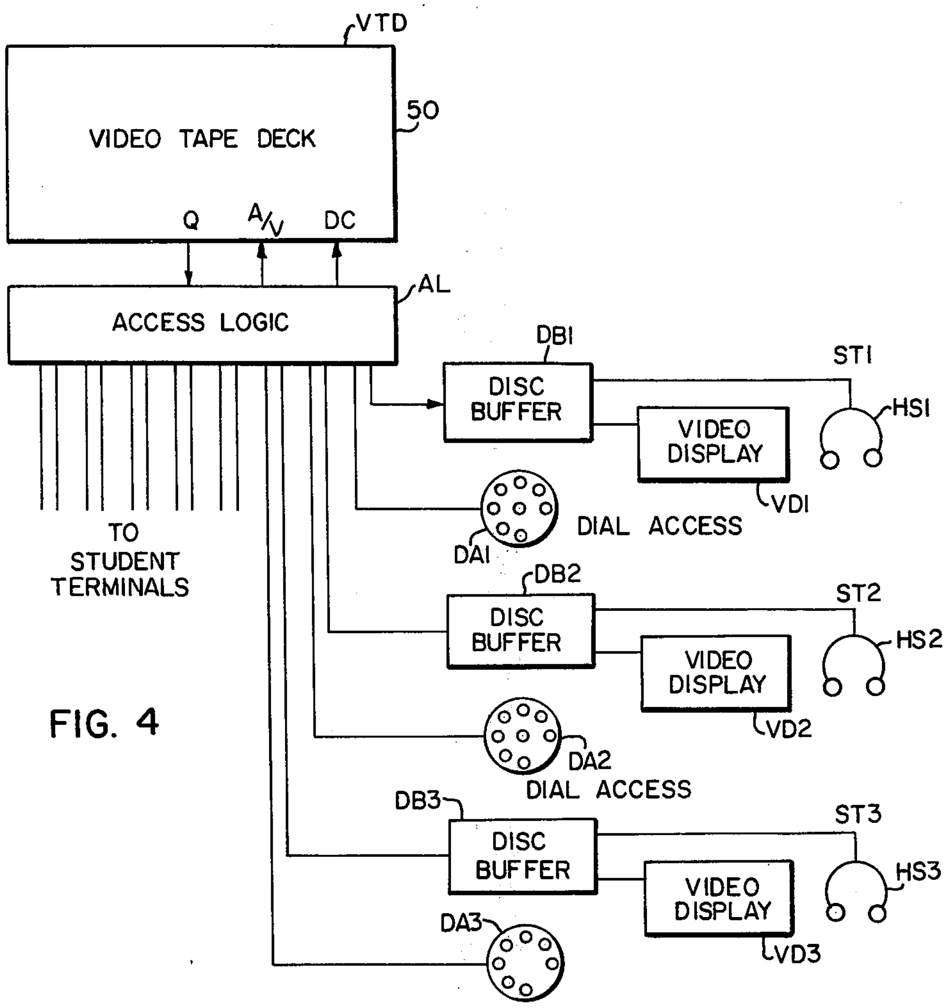
FIG. 4 is a block diagram showing the use of the present invention in an educational environment.

FIG. 4 shows an implementation of the present invention for use in an educational environment. In this embodiment a video tape deck 50 is employed at the audio-video library. The video tape deck may comprise a recorder of the well known helical scan type employing at least two recording/playback heads which scan the magnetic recording tape in a helical fashion such as shown schematically in FIG. 5.

Figure 5:
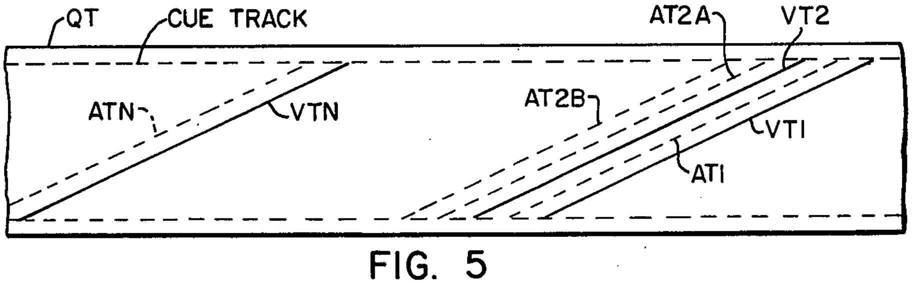
FIG. 5 is a pictorial diagram showing the recording scheme as utilized in the system of FIG. 4.

FIG. 5 shows a plurality of recorded teaching units each comprising one frame of video information and one or more 8.5 second increments of audio information correlated with the video information. A first unit is shown including a video track VT1 comprising one frame of video and one audio track AT1 comprising 8.5 second of audio information. The video information is recorded as described with respect to FIG. 1 wherein one frame is recorded on the track VT1 in one-thirtieth of a second by standard video recording techniques. The audio track AT1 is recorded on the disc as described in FIG. 1 with the low rate audio frequency signal being sampled at a rate of at least twice that of the highest frequency; the sampled signals are then recorded onto the tape in one disc revolution of one-thirtieth of a second by copying sequentially all samples from the disc to the tape.

After the unit VT1 - AT1 has been recorded, a second teaching unit comprising a video track VT2 and two audio tracks AT2A and AT2B are recorded. The audio track AT2A is recorded in the same manner as the track AT1 and constitutes 8.5 second of audio correlated to the video information on track VT2. The second audio AT2B constitutes another 8.5 seconds of audio also correlated to the video frame recorded on the track VT2. Hence a total of 17 seconds of audio correlated to the video frame VT2 is provided.

The audio-visual library as provided on the video recording tape thus constitutes a plurality of teaching units for example N in number with the Nth teaching unit being defined by a video track VTN and an audio track ATN.

On the tape of FIG. 5 a longitudinal Q track QT is provided which has coded signals recorded thereon corresponding to the respective teaching units so that through the use of a separate head as the tape is moved in the longitudinal direction the particular teaching unit in position for replay may be sensed.

In FIG. 4, the teaching system is shown to include a plurality of student terminals three of which, ST1, ST2, and ST3, are shown schematically. Each of the student terminals ST1, ST2 and ST3 includes, respectively, a disc buffer DB1, DB2, DB3; a video display VB1, VB2, VB3; a headset HS1, HS2 and HS3; and a dial access DA1, DA2, DA3.

A student at the respective student terminals ST1, ST2 and ST3 may select any of the teaching units recorded in the audio-visual library comprising the video tape deck VTD and the video tape recorded as indicated in FIG. 5. A student at the student terminal ST1 may for example, select a sequence of teaching units by dialing in the correct code via dial access DA1 for the desired teaching unit. The code from the dial access DA1 is applied to access logic AL and is registered therein. In response to the inputting of the dialed code into the access logic AL, the drive control DC input of the video tape deck VTD is activated causing the fast forward operation of the deck. The video tape is moved longitudinally with respect to a readout head sensing the coded information on the track QT of the tape. The coded information from track QT is inputted into the access AL and compared with the dial access input. Upon coincidence of the dial access input and Q input from the track QT, the fast forward operation of the deck VTD is stopped and the tape is properly positioned so that the selected sequence of teaching units are in position to be outputted from the A/V output of the deck VTD at normal playback speed.

In the normal playback condition, the selected video track is scanned in one-thirtieth of a second and distributed through the access logic AL to the disc buffer DB1. The disc buffer DB1 comprises a magnetic recording disc such as the disc 18 shown in FIG. 2 where the input thereto is recorded on a video track thereof.

In the next one-thirtieth of a second the audio information recorded on the associated audio track of the video tape is translated through the access logic AL and recorded on an audio track of the disc buffer DB1. If only one track of audio information is associated with the video track, the transfer of information from the video tape deck VTD to the disc buffer DB1 will thus be terminated. However, if additional audio tracks are associated with the selected teaching unit additional one-thirtieth of a second increments will be required for the information transfer. Once the information transfer has been completed, the video tape deck VDT will be free to be responsive to dial access inputs from another student terminal to search for the selected teaching unit and to perform the transfer of the video and audio information to the requesting student terminal.

The disc buffer DB1 includes the associated playback equipment corresponding to that shown in FIG. 3 including the audio read amplifier and demodulator 30, the sampling counter 32, the audio filter 34, and also the video read amplifier 38, and the demodulator 40. The video display VD1 may comprise television monitors corresponding to the display 42 of FIG. 3, and the headest HS1 may comprise the audio reproducer 36.

The other student terminals ST2, ST3, etc. would be identical in operation and structure as described with respect to the student terminal ST1.

It should be noted that through the use of the disc buffers DB1, DB2, DB3 the video tape deck VTD audio-visual library is employed only to transfer the various teaching units from the video recording tape to the disc buffer with this transferring occurring at the rate of one-thirtieth a second for example for each audio or visual video track. Without the use of the disc buffer, it would require for the sampling techniques of the present invention 8.5 seconds to transfer a single audio track directly to a student from the tape. Thus, through the use of the disc buffer a large number of teaching units can be selected by a large number of terminals in relatively short periods of time thereby providing ready access to the audio-visual library by each of the student terminals.

In the embodiment shown in FIG. 4 it should be noted that a number of video displays and headsets could be paralleled so that a plurality of students could receive the same teaching unit at the same time. Alternately, separate tracks could be employed on the magnetic disc of the disc buffer for recording different teaching units so that in a given classroom situation different students could be individually monitoring separate teaching units.

What is claimed is:

1. In a television system of the type wherein it is desired to store for retrieval a video signal comprising one frame of a scene together with audio signals which persist for a time period longer than the frame period of said video signal whereby the video signal can be repeated to produce a still picture on a television receiving tube while the audio signal is demodulated and applied to speaker means; the combination of:

means for sampling said audio signal at a predetermined rate sufficient to retain substantially all information content of said audio signal, means for recording said sampled audio signal in interleaved fashion on a track of a first rotatable storage medium in a predetermined number of revolutions of said storage medium, means for recording said video signal comprising one frame of a scene on another track of said storage medium, means for transferring the recorded interleaved audio and video signals to tracks on a second rotatable storage medium during one revolution of each of the first and second storage media, and means for recovering said audio and video signals from the second storage medium and applying them to a speaker means and a television receiving tube, respectively, during a number of revolutions of said second medium corresponding to said predetermined number of revolutions of the first medium.

2. Apparatus for storing and thereafter retrieving a visual signal comprising one frame of a scene together with audio signals which persist for a time period longer than the frame period of said video signal whereby the video signal can be repeated to produce a still picture on a television receiving tube while the audio signal is demodulated and applied to speaker means, comprising, means for sampling said audio signal at a predetermined rate sufficient to retain substantially all information content of said audio signals, means for recording said sampled audio signal in interleaved fashion on a track of a first rotatable storage medium in a first predetermined number of revolutions of said first storage medium with said first storage medium rotating at a constant speed, means for recording said video comprising one frame of a scene on another track of said first storage medium, means for transferring the recorded and interleaved audio and video signals to tracks of a second rotatable storage medium in a second predetermined number of revolutions of said first rotatable storage medium with said second storage medium rotating at said constant speed, said second predetermined number of revolutions being at least one full revolution but less than said first predetermined number of revolutions, and means for recovering audio and video signals from the second storage medium and applying them to a speaker means and a television receiving tube, respectively, during a number of revolutions of said second storage medium corresponding to said first predetermined number of revolutions of said first storage medium.

3. In the method for storing and thereafter retrieving a visual signal comprising one frame of a scene together with audio signals which persist for a time period longer than the frame period of said video signal whereby the video signal can be repeated to produce a still picture on a television receiving tube while the audio signal is demodulated and applied to speaker means; the steps of:

sampling said audio signal at a predetermined rate sufficient to retain substantially all information content of said audio signal;

recording said sampled audio signal in interleaved fashion on a track of a first rotatable storage medium in a first predetermined number of revolutions of said storage medium;

recording said video comprising one frame of a scene on another track of said storage medium;

transferring the recorded and interleaved audio and video signals to tracks on a second rotatable storage medium in a second predetermined number of revolutions of said first rotatable storage medium, said second predetermined number of revolutions being at least one full revolution but less than said first predetermined number of revolutions, and recovering said audio and video signals from the second storage medium and applying them to a speaker means and a television receiving tube, respectively, during a number of revolutions of said second storage medium corresponding to said first predetermined number of revolutions of said first medium.

4. A method as claimed in claim 3 wherein said first and second rotatable storage media rotate at a constant speed.

5. A method as claimed in claim 3 further including the steps of first transferring the recorded and interleaved audio and video signals of said first storage medium to a master video storage means, and thereafter transferring the recorded audio and video signals on the video storage means to said second rotatable storage medium.

6. In the method for storing and thereafter retrieving a video signal comprising one frame of a scene together, with audio signals which persist for a time period longer than the frame period of said video signal whereby the video signal can be repeated to produce a still picture on a television receiving tube while the audio signal is demodulated and applied to speaker means; the steps of:

sampling said audio signal at a predetermined rate sufficient to retain substantially all information content of said audio signal;

recording said sampled audio signal in interleaved fashion on a track of a first rotatable storage medium in a predetermined number of revolutions of said storage medium and while said first medium rotates at a first predetermined speed, recording said video signal comprising one frame of a scene on another track of said storage medium, transferring the recorded and interleaved audio and video signals to tracks on a second rotatable storage medium while the second medium rotates at a speed greater than said first predetermined speed, and recovering said audio and video signals from the second storage medium and applying them to a speaker means and a television receiving tube, respectively, during a number of revolutions of said second medium corresponding to said predetermined number of revolutions of the first medium and while the second medium rotates at said first predetermined speed.

7. The method of claim 6 wherein said first predetermined speed is such that the rotatable storage medium rotates through the revolution in a time period substantially equal to the frame period of said video signal.

8. The method of claim 6 wherein said video signal comprising one frame of a sense is recorded on another track of said first storage medium in a time period no greater than one revolution of the first storage medium.

9. The method of claim 8 and including the step of first transferring the recorded interleaved audio and video signals on the first storage medium to a master video storage means, and thereafter transferring the recorded audio and video signals on the video storage means to said second rotatable storage medium.

10. The method of claim 9 wherein the audio and video signals are transferred to and from the master video storage means with the respective first and second storage media rotating at said speed greater than the first predetermined speed.

* * * * *